July 15, 1924.

J. S. HARRIS

BOLT HOLDER TOOL

Filed July 16, 1923

INVENTOR
*James S. Harris,*
BY
*Arthur M. Hood.*
ATTORNEY

Patented July 15, 1924.

1,501,050

UNITED STATES PATENT OFFICE.

JAMES S. HARRIS, OF MORGANTOWN, INDIANA.

BOLT-HOLDER TOOL.

Application filed July 16, 1923. Serial No. 651,761.

*To all whom it may concern:*

Be it known that I, JAMES S. HARRIS, a citizen of the United States, residing at R. R. #3, Morgantown, in the county of Morgan and State of Indiana, have invented a new and useful Bolt-Holder Tool, of which the following is a specification.

My invention relates to improvements in means for holding bolts and the like during the process of assembling the parts which the bolts are intended to hold and during the placing thereon of the attaching nuts. My invention is particularly adapted for holding the bearing securing bolts in assembly position on the connecting rods of automobile engines, and particularly engines for Ford automobiles.

In the Ford automobile, when the engine is in place, the connecting rods, and particularly the connecting rod for the No. 4 piston, are more or less inaccessible, and due to the position of the body during the assembly of the bearings, it is practically impossible for the operator to hold the securing bolts in position, hold the bearing in position and attach the securing nuts with his two hands. The device embodying my invention is so designed that the operator can secure the same in position to hold the bolts against movement and then have his two hands free for holding the lower half of the bearing in position and setting the nuts.

Figure 1:
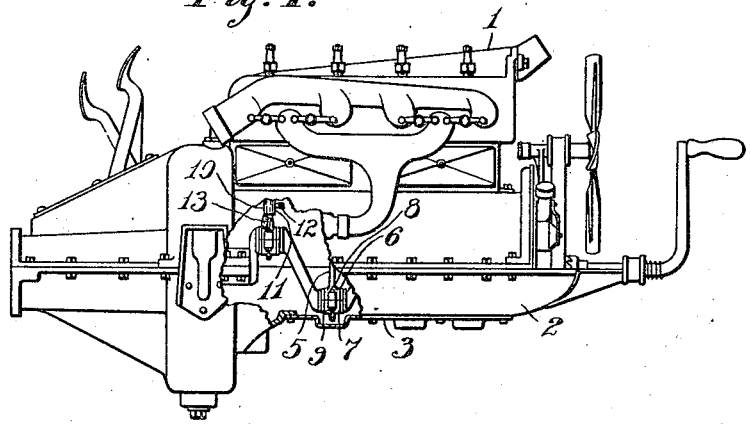
Figure 2:
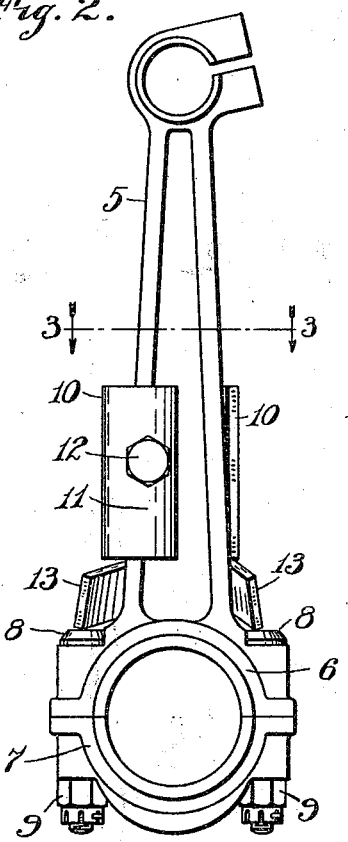
Figure 3:
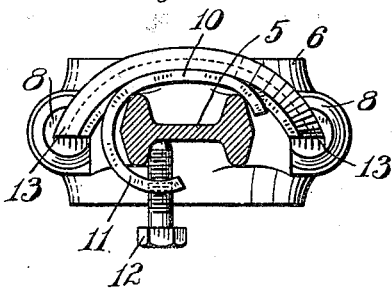

For the purpose of disclosing my invention I have illustrated one embodiment thereof in the accompanying drawings, in which Fig. 1 is a side elevation of a Ford engine showing my invention attached to the No. 4 connecting rod;

Fig. 2 is an enlarged view of the connecting rod showing my invention in position, and Fig. 3 is a sectional view on the line 3—3 of Fig. 2.

As shown in the drawings, the Ford engine 1 is, as in this type of engine, provided with a transmission and crank casing formed in upper and lower halves. The lower half 2 is practically formed from one piece and forms not only the crank casing, but also forms a casing for the fly wheel and transmission. The bottom of this lower half is provided with an opening having a cover plate 3 which is removable to permit access to the bearings. However, it will be noted that the rear end of this opening is beyond the No. 4 connecting rod so that this connecting rod is in a practically inaccessible position. The connecting rod 5 is of the usual construction, having at its lower end the upper half 6 of the bearing and having removably secured thereto, the lower half 7. This lower half of the bearing is maintained in position by securing bolts 8, having on their lower ends, nuts 9.

The bolt holder of my invention comprises a shank 10 which is arranged to lie substantially parallel with, and along one side of the connecting rod 5 and provided on one side with an embracing finger 11 which partially surrounds the connecting rod and is provided with a securing screw 12 which, when set up, securely clamps the shank on the connecting rod. The lower end of the shank is provided with a pair of laterally extending fingers 13 arched to partially surround the connecting rod and arranged to bear, when the holder is in position, upon the tops of the bolts 8.

In assembling the bearings, the operator secures the bolt retainer on the connecting rod, after the bolts have been inserted in position, and by seating the screw 12, the same will be locked in position and prevent the bolts 8 from sliding up. This leaves the two hands of the operator free to slip the lower half of the bearing in position on the bolts and attach the securing screws, it being unnecessary for the operator to pay any further attention to the holding of the bolts against riding up during the positioning of the bearings or the attaching of the securing nuts. It is to be noted that the holder snugly fits the connecting rod so that there is ample clearance whereby the holder may be left in position while the engine is being turned over for test purposes, thus avoiding the necessity of removing the holder each time the engine is tested until the bearing is properly adjusted. Of course, after the bearing has been scraped down and properly adjusted, the device will be removed, as it is not intended that the same be permanently attached to the connecting rod.

I claim as my invention:

1. A bolt holder for connecting rods of explosive engines, comprising a member arranged to be removably attached to the connecting rod above the bolts, and means carried by said member held into engagement by said member with the bolts to maintain the same in position during the assembling of the connecting rod bearing.

2. A bolt holder for connecting rods of an explosive engine, comprising a member for embracing the connecting rod, means for securing said member against displacement on the connecting rod and a bolt holding member arranged to engage the bolt to prevent the same from displacement during the bearing assembly operation.

3. A bolt holder for connecting rods of an explosive engine, comprising a member arranged to embrace the connecting rod, means for securing said member against displacement and a pair of fingers carried by said means and arranged to engage the bearing bolts and hold the same against displacement during the bearing assembly operation.

4. A bolt holder for connecting rods of an explosive engine, comprising a shank member arranged to lie parallel with and partially surround the connecting rod, means for securing said shank member in position on said connecting rod, and a pair of fingers carried by said shank arranged to be held into engagement with the tops of the bearing bolts and hold the same against displacement during the bearing assembly operation.

5. A bolt holder for connecting rods of an explosive engine, comprising a shank arranged to lie parallel with the connecting rod and having an embracing finger for embracing said connecting rod, a screw on said finger for clamping the shank on to the connecting rod, and a pair of flaring fingers at the bottom of said shank arranged to be held into engagement by said shank with the tops of the bearing bolts to hold the same against displacement during the bearing assembly operation.

6. A bolt holder for connecting rods of explosive engines comprising a shank, means for securing said shank to and parallel with the connecting rod, and a pair of fingers carried by said shank to partially embrace said rod and engage the heads of the bolts of said rod.

7. A bolt holder for connecting rods of explosive engines comprising a shank, means for securing said shank to and parallel with the connecting rod and a bolt engaging finger carried by said shank and arranged to partially embrace said rod.

8. A bolt holder for connecting rods of explosive engines comprising a pair of fingers constructed to partly embrace said rod and engage the bearing bolts of said rod and means for removably securing said fingers to said rod.

In witness whereof I, JAMES S. HARRIS, have hereunto set my hand at Morgantown, Indiana, this 12 day of July, A. D. one thousand nine hundred and twenty-three.

JAMES S. HARRIS.